(12) United States Patent
Molokanova et al.

(10) Patent No.: US 12,539,337 B2
(45) Date of Patent: Feb. 3, 2026

(54) NANOSTRUCTURE CONJUGATES FOR MODULATION OF LOCATION-SPECIFIC SUBTYPES OF RECEPTORS AND ION CHANNELS

(71) Applicant: Elena Molokanova, Encinitas, CA (US)

(72) Inventors: Elena Molokanova, Encinitas, CA (US); Gary B Braun, Santa Barbara, CA (US); Alex Savtchenko, Encinitas, CA (US)

(73) Assignee: Elena Molokanova, Encinitas, CA (US)

( * ) Notice: Subject to any disclaimer, the term of this patent is extended or adjusted under 35 U.S.C. 154(b) by 268 days.

(21) Appl. No.: 15/034,263

(22) PCT Filed: Nov. 4, 2014

(86) PCT No.: PCT/US2014/063963
§ 371 (c)(1),
(2) Date: May 4, 2016

(87) PCT Pub. No.: WO2015/069669
PCT Pub. Date: May 14, 2015

(65) Prior Publication Data
US 2016/0271271 A1    Sep. 22, 2016

Related U.S. Application Data

(60) Provisional application No. 61/962,335, filed on Nov. 5, 2013.

(51) Int. Cl.
*A61K 47/69* (2017.01)
*A61K 31/13* (2006.01)
*B82Y 5/00* (2011.01)

(52) U.S. Cl.
CPC .......... *A61K 47/6923* (2017.08); *A61K 31/13* (2013.01); *B82Y 5/00* (2013.01)

(58) Field of Classification Search
CPC ..... A61K 47/48861; A61K 31/13; B82Y 5/00
See application file for complete search history.

(56) References Cited

U.S. PATENT DOCUMENTS

| 7,282,194 | B2 | 10/2007 | Sung et al. |
| 7,879,361 | B2 * | 2/2011 | Sung .................... A61K 9/5146 424/408 |
| 7,947,645 | B2 | 5/2011 | Vitek et al. |
| 8,288,335 | B2 | 10/2012 | Vitek et al. |
| 8,337,811 | B1 | 12/2012 | Sung et al. |
| 8,361,439 | B1 | 1/2013 | Sung et al. |
| 8,445,021 | B2 | 5/2013 | Akhtari et al. |
| 8,815,584 | B1 | 8/2014 | Hickman et al. |
| 9,163,216 | B1 | 10/2015 | Hickman et al. |
| 9,267,936 | B2 | 2/2016 | Hickman et al. |
| 9,339,495 | B2 | 5/2016 | During |
| 9,376,690 | B2 | 6/2016 | Mirkin et al. |
| 9,404,140 | B1 | 8/2016 | Molnar et al. |
| 9,446,028 | B2 | 9/2016 | During |
| 9,489,474 | B2 | 11/2016 | Hickman et al. |
| 9,650,606 | B2 | 5/2017 | Hickman et al. |
| 9,737,562 | B2 | 8/2017 | Meloni et al. |
| 9,757,475 | B2 | 9/2017 | Mirkin et al. |
| 2003/0092029 | A1 * | 5/2003 | Josephson .......... A61K 49/1851 435/6.12 |
| 2008/0206146 | A1 | 8/2008 | Akhtari |
| 2010/0048653 | A1 | 2/2010 | Wang |
| 2010/0215740 | A1 | 8/2010 | Pilgaonkar et al. |
| 2010/0330167 | A1 | 12/2010 | Sung |
| 2011/0110868 | A1 * | 5/2011 | Akhtari ................ A61K 49/085 424/9.322 |
| 2011/0229553 | A1 | 9/2011 | Elisabetsky et al. |
| 2011/0274620 | A1 | 11/2011 | Harth et al. |
| 2013/0338383 | A1 | 12/2013 | Chodounska et al. |
| 2016/0009674 | A1 | 1/2016 | Vamvakides |
| 2016/0271271 | A1 | 9/2016 | Molokanova et al. |
| 2016/0303186 | A1 | 10/2016 | Spaller et al. |
| 2017/0007710 | A1 | 1/2017 | Charles et al. |
| 2017/0035889 | A1 | 2/2017 | Miller |
| 2017/0157038 | A1 | 6/2017 | Peyman |

FOREIGN PATENT DOCUMENTS

| CA | 2702494 A1 | 4/2009 |
| EP | 2211836 A2 | 8/2010 |
| EP | 2382983 B1 | 2/2014 |
| EP | 3065782 A1 | 9/2016 |
| WO | WO 2006/029028 A2 | 1/2007 |
| WO | WO 2009/008401 A2 | 1/2009 |
| WO | WO 2009/084017 A2 | 7/2009 |
| WO | WO 2011/053940 A2 | 5/2011 |
| WO | WO 2012/177986 A2 | 12/2012 |
| WO | WO 2013/127918 A1 | 9/2013 |

(Continued)

OTHER PUBLICATIONS

Oh et al. Langmuir, 2010, 26(10): 7604-7613. (Year: 2010).*
Xia et al. The Journal of Neuroscience, 2010, (30(33): 11246-11250. (Year: 2010).*
Maus et al (ACS NANO, 2010, 4(11): 6617-6628. (Year: 2010).*
Liu et al. "Synthesis, Stability, and Cellular Internalization of Gold Nanoparticles Containing Mixed Peptide-Poly(ethylene glycol) Monolayers." Anal.Chem., 2007, 79: 2221-2229. (Year: 2007).*
Oh et al. "Cellular Uptake and Fate of PEGylated Gold Nanoparticles Is Dependent on Both Cell-Penetration Peptides and Particle Size." ACS Nano, vol. 5, No. 8, Jul. 20, 2011, pp. 6434-6448. (Year: 2011).*
Oh et al. "One-Phase Synthesis of Water-Soluble Gold Nanoparticles with Control over Size and Surface Functionalities." Langmuir 2010, 26(10), 7604-7613. (Year: 2010).*
Liu et al. "Dopamine Receptor-Mediated Binding and Cellular Uptake of Polydopamine-Coated Nanoparticles." ACS Nano, 2021, 15, pp. 13871-13890. (Year: 2021).*

(Continued)

*Primary Examiner* — Doan T Phan
(74) *Attorney, Agent, or Firm* — Foley Hoag LLP; Ariana D. Harris; Mohanad Mossalam

(57) ABSTRACT

Nanostructure conjugates, methods for their preparation, and methods for their use are described. The nanostructure conjugates are useful in inhibiting, activating, and modulating extrasynaptic receptors and ion channels, and in treating various medical conditions among other attractive uses.

29 Claims, 3 Drawing Sheets

(56) References Cited

FOREIGN PATENT DOCUMENTS

| WO | WO 2015/069669 A1 | 5/2015 |
|---|---|---|
| WO | WO 2015/127037 A1 | 8/2015 |
| WO | WO 2016/168197 A1 | 10/2016 |
| WO | WO 2017/189561 A1 | 11/2017 |

OTHER PUBLICATIONS

Wiley et al. "Transcytosis and brain uptake of transferrin-containing nanoparticles by tuning avidity to transferrin receptor." PNAS, 2013, 110(21), pp. 8662-8667. (Year: 2013).*
Bhaskar et al.: "Multifunctional Nanocarriers for diagnostics, drug delivery and targeted treatment across blood-brain barrier: perspectives on tracking and neuroimaging?", Particle and Fibre Toxicology, vol. 7, No. 3, Mar. 3, 2010 (Mar. 3, 2010), pp. 1-25.
Bading "Therapeutic targeting of the pathological triad of extrasynaptic NMDA receptor signaling in neurodegenerations" The Journal of Experimental Medicine (Mar. 6, 2017); 214(3):569-578.
Bhaskar "Multifunctional Nanocarriers for diagnostics, drug delivery and targeted treatment across blood-brain barrier: perspectives on tracking and neuroimaging?" Particle and fibre toxicology (2010) vol. 7, No. 3, pp. 1-25.
Chen "Open-channel block of N-methyl-D-aspartate (NMDA) responses by memantine: therapeutic advantage against NMDA receptor-mediated neurotoxicity" Journal of Neuroscience (1992) vol. 12, pp. 4427-4436.
Chen "Mechanism of memantine block of NMDA-activated channels in rat retinal ganglion cells: uncompetitive antagonism" Journal of Physiology (1997) vol. 499, pp. 27-46.
Choi "Glutamate neurotoxicity and diseases of the nervous system". Neuron (1988) vol. 1, pp. 623-624.
Cottrell "Distribution, Density, and Clustering of Functional Glutamate Receptors Before and After Synaptogenesis in Hippocampal Neurons". Journal of Neurophysiology (2000) vol. 84, pp. 1573-1587.
Danysz "Alzheimer's disease, β-amyloid, glutamate, NMDA receptors and memantine—searching for the connections". British Journal of Pharmacology (2012) vol. 167, pp. 324-352.
Dhar "Polyvalent Oligonucleotide Gold Nanoparticle Conjugates as Delivery Vehicles for Platinum(IV) Warheads" J. Am. Chem. Soc. (2009) vol. 131, pp. 14652-14653.
Doane "The unique role of nanoparticles in nanomedicine: imaging, drug delivery and therapy" Chem. Soc. Rev. (2012) vol. 41, pp. 2885-2911.
Edmonds "Mechanisms of activation of glutamate receptors and the time course of excitatory synaptic currents". Annual review of physiology (1995) vol. 57, pp. 495-519.
Hardingham Extrasynaptic NMDARs oppose synaptic NMDARs by triggering CREB shut-off and cell death pathways. Nature Neuroscience (2002) vol. 5, pp. 405-414.
Hardingham "Synaptic versus extrasynaptic NMDA receptor signalling: implications for neurodegenerative disorders". Nature Reviews Neuroscience (2010) vol. 11, pp. 682-696.
Ikonomidou "Why did NMDA receptor antagonists fail clinical trials for stroke and traumatic brain injury?" Lancet Neurology (2002) vol. 1, pp. 383-386.
Jacobsen "Early-onset behavioral and synaptic deficits in a mouse model of Alzheimer's disease" Proceedings of the National Academy of Sciences of the United States of America (2006) vol. 103, pp. 5161-5166.
Johnson "Mechanism of action of memantine". Current Opinion in Pharmacology (2006) vol. 6, pp. 61-67.
Jokerst "Nanoparticle PEGylation for imaging and therapy". Nanomedicine (2011) vol. 6, pp. 715-728.
Kalia "NMDA receptors in clinical neurology: excitatory times ahead" Lancet Neurology (2008) vol. 7, pp. 742-755.
Kotermanski "Memantine binding to a superficial site on NMDA receptors contributes to partial trapping". Journal of Physiology (2009) vol. 587, pp. 4589-4604.

Li "Soluble Aβ Oligomers Inhibit Long-Term Potentiation through a Mechanism Involving Excessive Activation of Extrasynaptic NR2B-Containing NMDA Receptors". The Journal of Neuroscience (2011) vol. 31(18), pp. 6627-6638.
Lipton "Pathologically activated therapeutics for neuroprotection". Nature Reviews Neuroscience (2007) vol. 8, pp. 803-808.
Maus "Quantification and Reactivity of Functional Groups in the Ligand Shell of PEGylated Gold Nanoparticles via a Fluorescence-Based Assay" Langmuir (2009) vol. 25, pp. 7910-7917.
Maus "Inaugural-Dissertation: Entwicklung stabiler Gold Nanopartikel-Peptid-Konjugate zur Untersuchung von Rezeptor-Liganden Wechselwirkungen im zellulären System", May 24, 2010 (May 24, 2010), pp. 1-165.
Maus, English translation of "Inaugural-Dissertation: Development of stable gold nanoparticle-peptide conjugates for the study of receptor-ligand interactions in the cellular system", May 24, 2010 (May 24, 2010), pp. 1-155.
Maus "Conjugation of Peptides to the Passivation Shell of Gold Nanoparticles for Targeting of Cell-Surface Receptors" ACS Nano (2010) vol. 4, No. 11, pp. 6617-6628.
McKay "Recovery of NMDA receptor currents from MK-801 blockade is accelerated by Mg2+ and memantine under conditions of agonist exposure" Neuropharmacology (2013) vol. 74, pp. 119-125.
Nance "A dense poly (ethylene glycol) coating improves penetration of large polymeric nanoparticles within brain tissue". Science translational medicine (2012) vol. 4, pp. 149ra119-149ra119.
Okamoto "Balance between synaptic versus extrasynaptic NMDA receptor activity influences inclusions and neurotoxicity of mutant huntingtin". Nature Medicine (2009) vol. 15, pp. 1407-1413.
Palmer "The role of the blood brain barrier in neurodegenerative disorders and their treatment". Journal of Alzheimer's Disease (2011) vol. 24, pp. 643-656.
Palop "Amyloid-β—induced neuronal dysfunction in Alzheimer's disease: from synapses toward neural networks". Nature Neuroscience (2010) vol. 13, pp. 812-818.
Paoletti "NMDA receptor subunit diversity: impact on receptor properties, synaptic plasticity and disease". Nature Reviews Neuroscience (2013) vol. 14, pp. 383-400.
Papadia "Synaptic NMDA receptor activity boosts intrinsic antioxidant defenses". Nature Neuroscience (2008) vol. 11, pp. 476-487.
Parsons "Extrasynaptic NMDA Receptor Involvement in Central Nervous System Disorders". Neuron (2014) vol. 82, pp. 279-293.
Perrault "Mediating Tumor Targeting Efficiency of Nanoparticles Through Design" Nano Letters (2009) vol. 9, pp. 1909-1915.
Petralia "Organization of NMDA receptors at extrasynaptic locations". Neuroscience (2010) vol. 167, pp. 68-87.
Rahme "PEGylated gold nanoparticles: polymer quantification as a function of PEG lengths and nanoparticle dimensions" RSC Advances (2013) vol. 3, pp. 6085-6094.
Savchenko, et al., "Nanostructured Antagonist of Extrasynaptic NMDA Receptors", Nano Letters (2016), vol. 16, pp. 5495-5502.
Rusakov "Extrasynaptic Glutamate Diffusion in the Hippocampus: Ultrastructural Constraints, Uptake, and Receptor Activation" Journal of Neuroscience (1998) vol. 18, pp. 3158-3170.
Shankar "Natural Oligomers of the Alzheimer Amyloid-Protein Induce Reversible Synapse Loss by Modulating an NMDA Type Glutamate Receptor-Dependent Signaling Pathway". Journal of Neuroscience (2007) vol. 27, pp. 2866-2875.
Shankar "Amyloid-b protein dimers isolated directly from Alzheimer's brains impair synaptic plasticity and memory" Nature Medicine (2008) vol. 14, pp. 837-842.
Shrestha "Amyloid β peptide adversely affects spine number and motility in hippocampal neurons". Molecular and Cellular Neuroscience (2006) vol. 33, pp. 274-282.
Simoni "Combining Galantamine and Memantine in Multitargeted, New Chemical Entities Potentially Useful in Alzheimer's Disease." Journal of Medicinal Chemistry (2012) vol. 55, pp. 9708-9721.
Smith "Reversal of long-term dendritic spine alterations in Alzheimer disease models". Proceedings of the National Academy of Sciences of the United States of America (2009) vol. 106, pp. 16877-16882.

(56) References Cited

OTHER PUBLICATIONS

Sonavane "Biodistribution of colloidal gold nanoparticles after intravenous administration: Effect of particle size". Colloids and Surfaces B: Biointerfaces (2008) vol. 66, pp. 274-280.
Sousa "Functionalized gold nanoparticles: a detailed in vivo multimodal microscopic brain distribution study". Nanoscale (2010) vol. 2, pp. 2826-2834.
Spires-Jones "Spines, Plasticity, and Cognition in Alzheimer's Model Mice" Neural plasticity (2012) vol. 2012, Article ID 319836, 10 pages.
Talantova "Aβ induces astrocytic glutamate release, extrasynaptic NMDA receptor activation, and synaptic loss". Proceedings of the National Academy of Sciences of the United States of America (2013) vol. 110, pp. E2518-E2527.
Thorne "In vivo diffusion analysis with quantum dots and dextrans predicts the width of brain extracellular space". Proceedings of the National Academy of Sciences of the United States of America (2006) vol. 103, pp. 5567-5572.
Tovar "Mobile NMDA receptors at hippocampal synapses". Neuron (2002) vol. 34, pp. 255-264.
Wei "Amyloid-β from axons and dendrites reduces local spine number and plasticity". Nature Neuroscience (2010) vol. 13, pp. 190-196.
Wroge "Synaptic NMDA Receptors Mediate Hypoxic Excitotoxic Death". Journal of Neuroscience (2012) vol. 32, pp. 6732-6742.
Xia "Memantine Preferentially Blocks Extrasynaptic over Synaptic NMDA Receptor Currents in Hippocampal Autapses". Journal of Neuroscience (2010) vol. 30, pp. 11246-11250.
Yim "A facile approach for the delivery of inorganic nanoparticles into the brain by passing through the blood-brain barrier (BBB)" J. Chem. Commun. (2012) vol. 48, pp. 61-63.

Zhang "Decoding NMDA receptor signaling: identification of genomic programs specifying neuronal survival and death". Neuron (2007) vol. 53, pp. 549-562.
Maus et al., "Supporting Information" for "Conjugation of peptides to the passivation shell of gold nanoparticles for targeting of cell-surface receptors," ACS Nano, 2010, 4(11), 44 pages.
Beconi et al., "Pharmacokinetics of memantine in rats and mice" PLOS Currents Huntington Disease, Edition 1. doi: 10.1371 (2011).
Bloemer., "Drugs used in the treatment of Alzheimer's disease" Side Effects of Drugs Annual, vol. 42 (2020).
Creeley et al., "Low Doses of Memantine Disrupt Memory in Adult Rats" J. Neurosci., 26(15):3923-3932 (2006).
Duan et al., "Memantine induces manic episode in a 73-year-old patient with vascular neurocognitive disorder: a case report" Neuropsychiatric Disease and Treatment (14):1395-1398 (2018).
Huey et al., Development of subtle psychotic symptoms with Memantine: A case report, J.Clin Psychiatry, 66(5): (2005).
Monastero et al., "Visual hallucinations and agitation in Alzheimer's disease due to memantine: report of three cases" doi: 10.1136/jnnp.2006.096420.
Oh et al., "Cellular Uptake and Fate of PEGylated Gold Nanoparticles Is Dependent on Both Cell-Penetration Peptides and Particle Size" American Chemical Society, vol. 5, No. 8: 6434-6448 (2008).
Ondo et al., "A pilot study of the clinical efficacy and safety of memantine for Huntington's disease" Parkinsonism and Related Disorders, 13: 453-454 (2007).
Ridha et al., "Delusions and hallucinations in dementia with Lewy bodies: Worsening with memantine" Neurology, 65:481-482 (2005).
Segan., "Modulator, A Substance that regulates or changes the activity of another" Concise Dictionary of Modern Medicine (2006).
Tse et al., "The susceptibility to chronic social defeat stress is related to low hippocampal extrasynaptic NMDA receptor function" Neuropsychopharmacology 0:1-9; (2019).

* cited by examiner

NANOSTRUCTURE CONJUGATES FOR MODULATION OF LOCATION-SPECIFIC SUBTYPES OF RECEPTORS AND ION CHANNELS

CROSS-REFERENCE TO RELATED APPLICATIONS

This application claims priority from U.S. Patent Application Ser. No. 61/962,335 filed Nov. 5, 2013, the contents of which are incorporated herein in their entirety.

BACKGROUND

Glutamate is a major excitatory neurotransmitter in the brain. To provide a reliable and fast transmission of glutamate-mediated inter-neuronal communications, neurons possess sophisticated specialized structures of strict geometrical configurations. These structures, called synapses, are responsible for transducing the presynaptic signal into biochemical and electrical downstream events in the postsynaptic neuron via: a) the release of a certain number of neurotransmitter molecules directly into the synaptic cleft in response to the arrival of action potential to the presynaptic terminal, b) corresponding activation of specific neurotransmitter-gated receptors on the postsynaptic terminal, and c) fast removal of neurotransmitter molecules from the cleft volume through reuptake by specialized transporters in preparation for the next presynaptic signal. A narrow opening and a small volume of the synaptic cleft, a space between presynaptic and postsynaptic neurons, are helpful for maximizing the efficiency of the synaptic transmission by providing control over synaptic neurotransmitter concentrations. For example, the synaptic cleft at the common excitatory synapses has an average width of about 25±5 nm.

Glutamate triggers multiple signaling pathways by binding to and activating a set of transmembrane receptors, so called glutamate receptors. These receptors play a significant role in numerous physiological processes important for normal brain function, including excitatory glutamatergic neurotransmission, developmental plasticity, and higher cognitive functions such as memory acquisition, retention, and learning. Hypo- or hyperactivation of glutamate receptors is involved in many neurological and psychiatric conditions, such as neurodegeneration, stroke, pain, epilepsy, schizophrenia, and depression.

Glutamate receptors are present both inside and outside the synapses (synaptic and extrasynaptic locations, respectively). The location of glutamate receptors is not fixed, as receptor trafficking in and out of the synapses (lateral receptor mobility) that occurs during the brain development and in response to neuronal activity leads to the changes in synaptic vs. extrasynaptic distribution of glutamate receptors. Activation of synaptic glutamate receptors by glutamate released across the synaptic cleft mediates digital signal information processing due to the phasic nature of the presence of glutamate in the synaptic cleft. On the other hand, activation of extrasynaptic glutamate receptors by ambient glutamate ensures signal integration and determines the overall excitability of neuronal networks by contributing to the dynamic regulation of neuronal output, firing mode, and gain-control of neurotransmission. Extrasynaptic receptors can tonically modulate biochemical and electrical signaling of neurons for long periods of time due to the lack of spatially constrained mechanisms for controlling glutamate concentrations outside the synapses. There are several mechanisms responsible for increase of ambient concentrations of glutamate outside the synapses, including, a) spillover of transmitters from the synapse (especially during high frequency firing or when re-uptake transporters are affected), b) the reverse operation of transmitter transporters, resulting in their release instead of reuptake, c) transmitter release from glial cells or extrasynaptic varicosities of neuronal axons.

Glutamate receptors are categorized according to their structure and downstream activation pathways as ionotropic and metabotropic glutamate receptors. Ionotropic glutamate receptors belong to the family of ligand-gated ion channels: their channel pores open in response to the binding of glutamate, allowing the influx of cations which, in turn, result in depolarization of the cell membrane and the generation of downstream electrical signals. There are three pharmacologically distinct types of ionotropic glutamate receptors that are classified according to their preferred agonists: a-amino-3-hydroxyl-5-methyl-4-isoxazole-propionate (AMPA), N-methyl-D-aspartate (NMDA), and kainate. Metabotropic glutamate receptors (eight different types in three groups) belong to the family of G-protein-coupled receptors that upon the binding of glutamate trigger activation of G protein subunits, leading to subsequent modulation of the function of various effector molecules such as enzymes, ion channels, and transcription factors.

NMDA receptors (NMDARs) are uniquely positioned to play a central role in numerous physiological processes due to their permeability to calcium ions and dependency of their functional activity from the cell membrane potential. NMDARs are also involved in many pathological processes, as they are widely recognized as significant receptors that mediate glutamate-induced excitotoxicity. Specifically, hyperactivation of NMDARs is found to be associated with many acute and chronic neurological disorders such as cerebral ischemia, traumatic brain injury, epilepsy, Alzheimer's, Parkinson's, and Huntington's diseases, HIV-associated neurocognitive disorders, and amyotrophic lateral sclerosis. Hypoactivation of NMDARs has been implicated in neurodevelopmental disorders, specifically schizophrenia, via the mechanism of disinhibition of excitatory (cholinergic/glutamatergic) projections in significant areas of the brain.

NMDARs have long been recognized as important therapeutic targets, and several NMDAR antagonists have been tested to assess their neuroprotective ability. The drugs that completed trials included antagonists of the glutamate site (selfotel) and the glycine site (gavestinel), an antagonist of the ion-channel site (aptiganel), and an NR2B subunit-selective antagonist (traxoprodil). Unfortunately, practically all NMDAR antagonists exhibited significant side effects ranging from psychotomimetic symptoms and motor impairment, and, as a result, failed during clinical studies. Apparently, these side effects originated because in addition to inhibiting the pathological activity NMDAR antagonists also blocked physiological activity, interrupting normal synaptic signaling and adversely affecting normal brain function. Therefore, the current consensus in the neuroscience community is that in order to be clinically tolerable and pharmacologically efficient, NMDAR antagonists should be highly discriminative in their action: block only excessive, pathological activity while preserving normal synaptic activity.

Recent results suggest that NMDARs at different subcellular locations can have different, and sometimes, opposing effect on the neuronal fate. Namely, physiological synaptic activity is supported by synaptic NMDARs (sNMDARs) in functioning synapses with highly regulated glutamate concentrations, while pathological activity is caused by elevated ambient glutamate concentrations outside the synapses and subsequent activation of extrasynaptic NMDARs (eNMDARs). Generally, physiological activation of sNMDARs tends to be neuroprotective via engagement of multiple pathways that enhance antioxidant defenses, nuclear signaling to cAMP response element binding protein (CREB), and signaling by extracellular signal-regulated kinase (ERK1/2). Additionally, intrinsic apoptotic pathways are downregulated. In contrast, eNMDAR activity can initiate signaling cascades leading to neuronal damage by shutting-off pro-survival pathways, activating synaptic injury and pro-apoptotic molecules enhancing neuronal COX-2 expression, and mediating tau-dependent neurodegeneration.

Recent studies on ischemic brain injury have suggested that eNMDAR activity inhibits neuroprotective pathways and triggers neuronal injury, while physiological sNMDAR activity, in general, stimulates neuroprotective transcriptional and antioxidant pathways. A similar pattern is emerging for several neurodegenerative disorders such as Huntington's disease and AD. Therefore, drugs that can modulate eNMDARs will affect pathological, but not physiological activity, thus providing therapeutic effects without side effects.

SUMMARY

In one embodiment, a nanostructure conjugate can comprise at least one nanostructure linked to at least one modulator compound targeting a membrane protein at an extrasynaptic location. In another embodiment, the modulator compound is a NMDA modulator. In one embodiment, the modulator compound is an adamantane compound.

In another embodiment, a method of preparing a nanostructure conjugate can comprise linking at least one nanostructure to at least one adamantane compound. In one embodiment, a nanostructure is linked to at least one NMDA modulator.

In a further embodiment, a method of inhibiting an extrasynaptic protein can comprise contacting an extrasynaptic protein with a nanostructure conjugate having an average hydrodynamic diameter larger than a synaptic cleft opening. In one embodiment, the extrasynaptic proteins are glutamate receptors, glycine receptors, GABA receptors, cholinergic receptors, opioid receptors, adrenergic receptors, dopaminergic receptors, serotonin receptors, histamine receptors, neurotransmitter transporters, calcium ion channels, potassium ion channels, sodium ion channels, or chloride ion channels. In one embodiment, the glutamate receptor is an NMDA receptor. In another embodiment, the nanostructure conjugate has an average hydrodynamic diameter of about 5 nm to about 150 nm, or about 20 nm to about 40 nm.

An additional method of inhibiting an extrasynaptic protein can comprise contacting an extrasynaptic protein with an antagonist having an average hydrodynamic diameter larger than a synaptic cleft opening, wherein the antagonist does not inhibit synaptic proteins. In one embodiment, the antagonist has an average hydrodynamic diameter of about 5 nm to about 150 nm. In another embodiment, the antagonist has an average hydrodynamic diameter of about 20 nm to about 40 nm.

A method of treating an animal having a medical condition can comprise administering to the animal a nanostructure conjugate comprising at least one nanostructure linked to at least one modulator compound; wherein the medical condition is any of various pathological conditions, including, but not limited to Alzheimer's disease; Parkinson's disease; amyotrophic lateral sclerosis; Huntington's disease; chemotherapy-induced neuropathy; age-related brain dysfunctions; Down's syndrome; autism; Asperger's Syndrome; Rett syndrome; Fragile X syndrome; Korsakoffs disease; cerebral palsy; epilepsy and other seizure disorders; affective disorders; sleep disorders; traumatic brain injury, encephalopathy, and other traumatic-related injuries or diseases; schizophrenia and other psychotic disorders; pain, neuropathic pain, hyperalgesia and disorders of nociception; addictive disorders; multiple sclerosis and other autoimmune diseases. The condition can also be ischemia; neuronal reperfusion injury; neuronal trauma or hemorrhage; neuronal infection; stroke; neuronal exposure to a toxic substance; glaucoma and other eye disorders; emetic disorders and conditions; side effects caused by brain radiation therapy; vascular dementia, or HIV-associated dementia. In one embodiment, the modulator compound is an adamantane compound.

An additional method of treating an animal having a medical condition can comprise administering to the animal an NMDA antagonist having an average hydrodynamic diameter greater than a synaptic cleft opening. In one embodiment, the NMDA antagonist has an average hydrodynamic diameter of about 5 nm to about 150 nm or about 20 nm to about 40 nm.

Analysis of charge transfer (FIG. 4C), frequency (FIG. 4D) and amplitude (FIG. 4E) of NMDA receptor-mediated sEPSCs in the presence of free memantine molecules and Au-Mem are shown. Data were normalized to their control value in the absence of any drug treatments for that same cell. Data are presented as mean±SEM (n≥4 cells in each case); *, P<0.01 (paired t-test on raw data).

Figure 5:
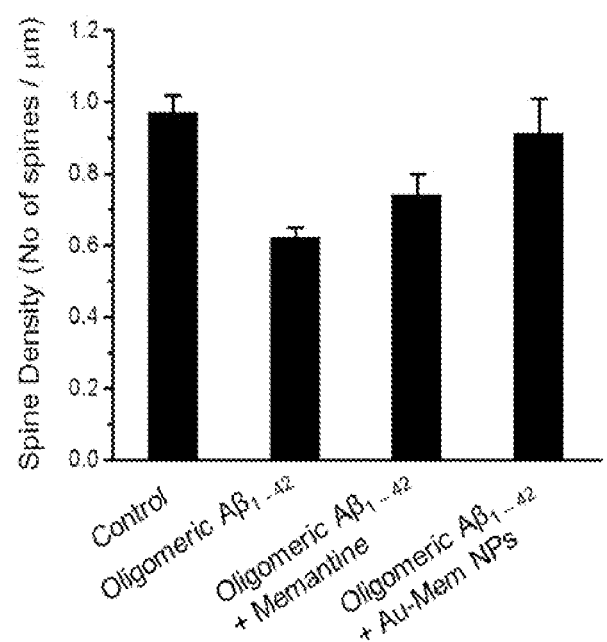

FIG. 5 shows that Au-Mem nanostructure conjugates prevented dendritic spine loss by Aβ oligomers in hippocampal slices. Hippocampal neurons from YFP-transgenic mice were exposed for 10 days to control media or synthetic Aβ1-42 (500 nM oligomers) in the presence or absence of 10 μM memantine or 50 nM Au-Mem. Data are presented as mean±SEM (n≥4 cells in each case); *, P<0.01 (paired t-test on raw data).

DETAILED DESCRIPTION

This disclosure is not limited to the particular systems, devices and methods described, as these may vary. The terminology used in the description is for the purpose of describing the particular versions or embodiments only, and is not intended to limit the scope.

Figure 1:
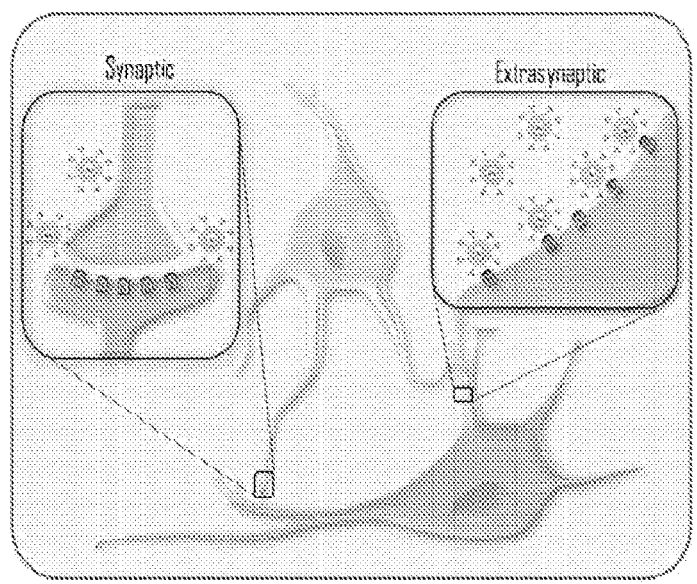
FIG. 1 shows a strategy for rational design of pharmacologically active nanostructures that are capable of selective or exclusive modulation of eNMDARs without affecting sNMDARs. This strategy is based on the spatial mismatch between the size of NMDA modulator molecules and the ease of an access to specific subcellular locations. Specifically, a chemical structure larger than the width of the synaptic cleft, will not be able to access the receptors located inside the synapse, but will be able to interact with receptors located elsewhere.

This disclosure presents, among other things, nanostructure conjugates, methods of preparing the nanostructure conjugates, methods of inhibiting extrasynaptic proteins, including NMDA receptors, and methods of treating an animal having a medical condition. A general design strategy is shown in FIG. 1.

In one embodiment, a nanostructure conjugate can comprise at least one nanostructure linked to at least one modulator compound. In a further embodiment, the modulator compound is an adamantane compound. In another embodiment, the modulator compound is a NMDA antagonist.

The nanostructure can generally be any type of nanostructure. In one embodiment, the nanostructure can generally be any type of nanoparticle. Examples of nanoparticles include metal nanoparticles, such as gold nanoparticles, silver nanoparticles, and iron nanoparticles. Other examples include semiconductor nanoparticles, a core-shell nanoparticle, an inorganic core with a polymer shell, or an organic core with a polymer shell. Alternatively, the nanoparticle can be an organic nanoparticle, such as a crosslinked polymer, hydrogel polymer, biodegradable polymer, polylactide (PLA), polyglycolide (PGA), polycaprolactone (PCL), copolymers, polysaccharides, starch, cellulose, chitosan, polyhydroxyalkanoates (PHA), PHB, PHV, or combinations thereof.

The adamantane compound can generally be any adamantane compound. Adamantane compounds are based on a core structure of four connected cyclohexane rings arranged in armchair configurations. Adamantane has a chemical structure of $C_{10}H_{16}$. Memantine is a type of adamantane compound having the chemical name 3,5-dimethyladamantan-1-amine. Memantine can be easily conjugated or linked to other moieties through its primary amino group. Memantine is marketed for use in treating Alzheimer's disease and dementia. Rimantadine is yet another adamantane compound that can be easily conjugated or linked to other moieties through its primary amino group. Rimantadine has a chemical name (RS)-1-(1-adamantyl)ethanamine.

The NMDA antagonist can be generally any type of an NMDA antagonist, including, but to limited to APV (R-2-amino-5-phosphonopentanoate), AP7 (2-amino-7-phosphonoheptanoic acid), Atomoxetine, Amantadine, AZD6765, CPPene (3-[(R)-2-carboxypiperazin-4-yl]-prop-2-enyl-1-phosphonic acid), Delucemine, Dexoxadrol, Dextrallor- phan, Dextromethorphan, Dextrorphan, Diphenidine, Dizocilpine, Eliprodil, Eticyclidine, Etoxadrol, Gacyclidine, HU-211, Ibogaine, Ketamine, Methoxetamine, Methoxydine, Neramexane, Phencyclidine, Rolicyclidine, Tenocyclidine, Tiletamine, Remacemide, Remacemide, Rhynchophylline, Selfotel.

The nanostructure can be directly linked to the modulator compound, or can be indirectly linked through a linker. The linking can typically be covalent, but non-covalent linking is also possible. The linker can generally be any type of linker and can be of any length. One example of a linker is polyethylene glycol (PEG). Other linkers include polylactic acid (PLA), poly(alkylene glycols), poly(oxyethylated polyol), poly(olefinic alcohol), poly(vinylpyrrolidone), poly (hydroxyalkylmethacrylamide), poly(hydroxyalkylmethacrylate), poly(saccharides), poly(a-hydroxy acid), poly(vinyl alcohol), polyphosphazene, polyoxazoline, poly(N-acryloylmorpholine), poly(acrylic acid), carboxymethyl cellulose, hyaluronic acid, hydroxypropylmethyl cellulose, and copolymers, terpolymers, and mixtures thereof. Linkers can generally be in any geometry or form, such as linear forms (for example, alkoxy PEG or bifunctional PEG), branched or multi-arm forms (for example, forked PEG or PEG attached to a polyol core), pendant PEG, or PEG with degradable linkages therein. In one embodiment, the linker is a linear linker.

The modulator compound can be linked to the nanostructure or the linker through generally any type of bond. Examples of bonds include an ether bond, an ester bond, an amide bond, an alkene bond, an alkyne bond, or combinations thereof. Other examples include heteroatom, -alkylene-, —O-alkylene-O—, -alkylene-O-alkylene-, -aryl-O—, —O-aryl-, (—O-alkylene-)$_m$, (-alkylene-O—)$_m$ linkage, wherein m is 1-1000, thioether, imine, disulfide, metal-organic bond, chelation, ionic bond, electrostatic bond, hydrogen bond, or combinations thereof.

The nanostructure conjugate can generally contain any number of modulator compounds linked to each nanostructure. One example is about five to about 200 modulator compounds are linked to each nanostructure. Specific examples are about 5, about 6, about 7, about 8, about 9, about 10, about 20, about 30, about 40, about 50, about 60, about 70, about 80, about 90, about 100, about 110, about 120, about 130, about 140, about 150, about 160, about 170, about 180, about 190, about 200, and ranges between any two of these values (including endpoints), or ranges above any one of these values.

The nanostructure conjugate can generally have any average hydrodynamic diameter. In one embodiment, the average hydrodynamic diameter is at least about 5 nm. In another embodiment, the average hydrodynamic diameter is equal to or less than about 150 nm. In another embodiment, the average hydrodynamic diameter is about 5 nm to about 150 nm or about 20 nm to about 40 nm. Specific examples of hydrodynamic diameters include about 5 nm, about 10 nm, about 25 nm, about 50 nm, about 75 nm, about 100 nm, about 125 nm, about 150 nm, and ranges between any two of these values (including endpoints). In some embodiments, the nanostructure conjugate can have an average hydrodynamic diameter larger than a synaptic cleft opening. In other embodiments, the nanostructure conjugate can have at least one hydrodynamic size dimension of about 5 nm to about 150 nm or about 20 nm to about 40 nm.

An additional embodiment is directed towards methods of preparing the above-described nanostructure conjugates, the methods comprising linking at least one nanostructure to at least one modulator compound. In some embodiments, the linking can comprise forming a covalent bond between the nanostructure and the modulator compound. In other embodiments, the linking can comprise forming a covalent bond between the nanostructure and a linker, and forming a covalent bond between the linker and the modulator compound.

A further embodiment is directed towards methods of inhibiting an extrasynaptic protein, the method comprising contacting an extrasynaptic protein with a nanostructure conjugate having an average hydrodynamic diameter of about 5 nm to about 150 nm or about 20 nm to about 40 nm. In some embodiments, the nanostructure conjugate can have an average hydrodynamic diameter larger than a synaptic cleft opening. In some embodiments, the nanostructure conjugate does not inhibit synaptic proteins. The nanostructure conjugate can generally be any of the nanostructure conjugates described above. In one embodiment, the extrasynaptic protein can be a NMDA receptor.

Other methods of inhibiting an extrasynaptic protein can comprise contacting an extrasynaptic protein with its antagonist with an average hydrodynamic diameter of about 5 nm to about 150 nm or about 20 nm to about 40 nm. In some embodiments, the antagonist does not inhibit synaptic proteins. In one embodiment, the extrasynaptic protein can be a NMDA receptor.

A further embodiment is directed towards methods of treating an animal having a medical condition, the method comprising: administering to the animal a nanostructure conjugate comprising at least one nanostructure linked to at least one modulator compound; wherein the medical condition is any of various pathological conditions, including, but not limited to, Alzheimer's disease; Parkinson's disease; amyotrophic lateral sclerosis; Huntington's disease; chemotherapy-induced neuropathy; age-related brain dysfunctions; Down's syndrome; autism; Asperger's Syndrome; Rett syndrome; Fragile X syndrome; Korsakoffs disease; cerebral palsy; epilepsy and other seizure disorders; affective disorders; sleep disorders; traumatic brain injury, encephalopathy, and other traumatic-related injuries or diseases; schizophrenia and other psychotic disorders; pain, neuropathic pain, hyperalgesia and disorders of nociception; addictive disorders; multiple sclerosis and other autoimmune diseases. The condition can also be ischemia; neuronal reperfusion injury; neuronal trauma or hemorrhage; neuronal infection; stroke; neuronal exposure to a toxic substance; glaucoma and other eye disorders; emetic disorders and conditions; side effects caused by brain radiation therapy; vascular dementia, or HIV-associated The nanostructure conjugate can generally be any of the nanostructure conjugates described above. The animal can generally be any animal. Examples of animals include a mammal, a primate, a human, a dog, a cat, a mouse, a rat, a cow, a horse, and a pig. The nanostructure conjugate can be delivered in generally any effective manner. Examples of administering methods include intranasal delivery, intraperitoneal delivery, interstitial delivery, intracerebral, intrathecal, transcranial, epidural, via brain lymphatics, intravitreal, otologic, through inhalation, intravenous drug delivery, or a combination thereof.

Another embodiment is directed towards methods of treating an animal having a medical condition, the method comprising: administering to the animal an NMDA antagonist having an average hydrodynamic diameter of about 5 nm to about 150 nm or about 20 nm to about 40 nm; wherein the medical condition is any of various pathological conditions.

Another embodiment is directed towards methods of treating an animal having a medical condition, the method comprising: administering to the animal a nanostructure conjugate comprising at least one nanostructure linked to at least one adamantane compound, having an average hydrodynamic diameter of about 5 nm to about 150 nm or about 20 nm to about 40 nm; wherein the medical condition is any of various pathological conditions.

EXAMPLES

Example 1

Chemical Synthesis

Gold NPs were synthesized by citrate reduction of chloroauric acid ($HAuCl_4$; Acros Organics; Geel, Belgium). Briefly, 197 mg of $HAuCl_4$ in 10 mL of Milli-Q (18.2 Ohm) water was diluted with 500 mL of additional water and brought to a vigorous boil. 50 mL of 13.7 mg/mL sodium citrate trihydrate (Sigma; St. Louis, MO, USA) was rapidly added and boiling was continued for 30 minutes. The resultant Au NP solution with absorption peak at 520 nm was cooled to room temperature. The citrate shell was displaced by a mixture of thiol-modified PEGs terminated with methoxy or carboxylate, at a nominal molar ratio of 4:1 methoxy:carboxylate. Synthetic yield was characterized by absorbance measurements of an aliquot, using the plasmon peak at 520 nm. Concentrations of Au NPs were calculated using an extinction coefficient of $1.97 \times 10^8$ $M^{-1}$ $cm^{-1}$. To determine their diameter, at least 50 Au NPs were analyzed by transmission electron microscopy (TEM) by depositing a diluted aqueous solution onto carbon-coated grids, followed by wicking and drying in a stream of nitrogen.

Example 2

Conjugation

HS-PEG-OCH3, 2 kDa (Rapp Polymere; Tuebingen, Germany) was prepared in 95% ethanol at 24 mg/mL, and HS-PEG-COOH, 3 kDa (Rapp Polymere) at 9 mg/mL. 400 µL of each were premixed and combined with 100 mL of Au citrate, reaction (i) in FIG. 1. The following day the PEG coated Au NP were purified from free ligand using Amicon centrifugal filters having a molecular weight cutoff of 100 kDa (washed with 0.1×PBS) and concentrated to 2 mL (200 optical density at 520 nm (O.D.)). EDC coupling of drug molecules was performed next. Memantine HCl, Amantadine HCl, glucosamine, amino-PEG-OCH3 MW 750 (Sigma; St. Louis, MO, USA) were each dissolved in 2-(N-Morpholino)ethanesulfonic acid buffer (MES, 0.1 M, pH 4.3 with NaOH). Glucosamine was used due to its similar size and functional group for attachment, and potential recognition by a different class receptor.

100 µL EDC (30 mg/mL in MES), was added to 300 µL Au NPs and incubated for 2 minutes. Then 100 µL of N-hydroxysuccinimide (NHS) in MES was added. After 5 minutes, 100 µL of amine-drug (70 mM in water) was combined and coupling proceeded for 1 hour. To raise the pH and accelerate the reaction, 25 µL of carbonate buffer was added (7.5% solution, pH 9.3; Gibco; Grand Island, NY, USA). After 1 hour, 50 µL more each of EDC and NHS solutions were added with incubation overnight. The Au NP products were twice pelleted and washed at 21 k RCF with 1×PBS (containing Tween 20 at a concentration of 0.005% w/w), and stored at 4° C. overnight. The following day extensive dialysis was performed into 1×PBS (without Tween 20) using a 20 kDa Slide-a-Lyzer (Pierce; Rockford, IL, USA), with three buffer changes over 48 hours. The Au NP products were diluted to 27 to 200 O.D. in DPBS (Hyclone; Waltham, MA, USA) and filtered (0.22 μm; Millipore; Billerica, MA, USA).

Dynamic light scattering (DLS) was performed using a Zetasizer Nano (Malvern Instruments; Malvern, Worcestershire, UK). A sample of Au-PEG-Memantine was diluted in phosphate buffered saline (Gibco; Grand Island, NY, USA). Z-average hydrodynamic radius was indicated by the software. The Au-Mem solutions were stable for at least several months when sterile filtered and stored at 4° C. in sealed Eppendorf tubes. Slight settling and adsorption to container walls could be reversed by brief sonication.

To quantify the approximate number of molecules that could be attached to a 12-nm Au NP, thiol-PEG-amine (3 kDa, Rapp Polymere) was used in place of the thiol-PEG-carboxylate. Instead of reacting the gold-COOH, the gold-NH2 was reacted with amine reactive dye, Oregon Green 488 succinimidyl ester (OR488, Life Technologies). After conjugation of OR488 to Au NPs in place of the drug and purification of the final product, the dye molecules were displaced using dithiothreitol, and their number was characterized by measurements of fluorescence intensity.

Free memantine was removed by centrifugation of the Au-Mem at 21 k RCF, with redispersion in PBS, and transfer to new tubes between rounds. At minimum five rounds performed with a purification factor of at least 50-fold, given by the volume initial divided by volume after removing the supernatant. The final product was estimated to have a free memantine concentration of less than 20 nM.

Example 3

Cell Culture

Primary cerebrocortical cultures were made from E16 rat pups and grown on 12-mm glass coverslips. Briefly, cortices were dissected from 1 to 2 days old rats and enzymatically treated (papain, 200 U/ml; 30 minutes, 37° C.). After mechanical dissociation in minimum essential medium (MEM; Gibco; Grand Island, NY, USA), the cells were plated into culture flasks and grown at 37° C. in a humidified 5% $CO_2$/95% air atmosphere.

Example 4

Electrophysiological Recordings

Whole-cell voltage-clamp recordings were performed from neurons after 14 days in vitro. The extracellular solution contained: 135 mM NaCl, 2.5 mM KCl, 2 mM $CaCl_2$, 0-0.01 mM $MgCl_2$, 1 mM $NaHCO_3$, 0.34 mM $Na_2HPO_4$, 0.44 mM $KH_2PO_4$, 20 mM glucose, 10 mM Hepes, pH 7.4. Patch electrodes with a final tip resistance of 4-7 MΩ, were filled with a solution containing (in mM): 120 mM CsCl, 20 mM tetraethylammonium chloride (TEA-Cl), 10 mM Hepes, 2.25 mM EGTA, 1 mM $CaCl_2$, 2 mM $MgCl_2$, 0.001 mM and phalloidin, pH 7.4. pCLAMP 10 software (Molecular Devices; Sunnyvale, CA, USA) was used for data acquisition and analysis. All recordings were performed using an Axopatch 200B amplifier (Molecular Devices; Sunnyvale, CA, USA) at room temperature with a holding potential of −70 mV. Currents were digitally sampled at 10-20 kHz and filtered at 2-5 kHz.

Currents were acquired using a Digidata 1322 interface and pClamp 10.1 software. All recordings were made at room temperature at a holding potential of −70 mV. The extracellular solution contained the following: 137 mM NaCl, 1 mM $NaHCO_3$, 0.34 mM $Na_2HPO_4$, 5.36 mM KCl, 0.44 mM $KH_2PO_4$, 3 mM $CaCl_2$, 5 mM HEPES, 22.2 mM glucose, 0.01 mM glycine, and 0.003 mM strychnine, pH adjusted to 7.2. The intracellular solution contained the following: 120 mM CsCl, 20 mM tetraethylammonium chloride, 10 mM HEPES, 2.25 mM EGTA, 1 mM $CaCl_2$, 2 mM $MgCl_2$, 4 mM MgATP, 0.3 mM GTP, and 10 mM phosphocreatine, pH adjusted to 7.2.

Currents were acquired using a Digidata 1322 interface and pClamp 10.1 software. All recordings were made at room temperature at a holding potential of −70 mV. The extracellular solution contained 137 mM NaCl, 1 mM $NaHCO_3$, 0.34 mM $Na_2HPO_4$, 5.36 mM KCl, 0.44 mM $KH_2PO_4$, 3 mM $CaCl_2$, 5 mM HEPES, 22.2 mM glucose, 0.01 mM glycine, and 0.003 mM strychnine, pH adjusted to 7.2. The intracellular solution contained 120 mM CsCl, 20 mM tetraethylammonium chloride, 10 mM HEPES, 2.25 mM EGTA, 1 mM $CaCl_2$, 2 mM $MgCl_2$, 4 mM MgATP, 0.3 mM GTP, and 10 mM phosphocreatine, pH adjusted to 7.2.

The spontaneous NMDAR-mediated sEPSCs are usually presented as bursts, with each burst consisting of multiple EPSCs. Therefore, total "charge transfer" can be used as an indicator of the magnitude of NMDAR-mediated sEPSCs, since this parameter contains information about both amplitude and frequency. To perform the analysis of NMDAR-mediated sEPSCs, first, the initial transient component of sEPSCs were excluded. This component represents $Na^+$ and/or AMPA-mediated currents, and can be easily isolated using the temporal separation approach. Then, the values for charge transfer of each NMDAR-mediated sEPSC starting from the peak of the first NMDAR-mediated sEPSC and continuing to the baseline were determined, which took about 2 seconds in the majority of analyzed sEPSCs. Subsequently, the sum of the charge transferred during individual bursts for each condition was normalized to the control value for that same cell. Additionally, the frequency and amplitude of NMDAR-mediated sEPSCs were calculated for each experimental condition during about 100 seconds of recording time. The mean amplitude was calculated by averaging the amplitude of the maximal NMDA-mediated current in each burst. To examine the spontaneous synaptic activity at the equilibrium, the initial 10 seconds of each drug application was excluded from the analysis. Normalization of all parameters was performed for each cell to negate experimental variations between neurons. Data are expressed as mean±SEM, and statistical significance was determined using a Student's t-test for pairwise comparisons.

Example 5

Statistical Analysis

Data were expressed as mean±SEM. When suitable, results were interpreted using a one-way ANOVA with a Student-Newman-Keuls (SNK) post-hoc test. Pairwise comparisons between genotypes/treatments were assessed with a Student's t-test. Differences were considered statistically significant at $P<0.05$.

Example 6

Dendritic Spine Analysis

Thy1-YFPH transgenic mice (8-10 days old) were used to prepare organotypic hippocampal slices using the interface method. Brains were dissected out under isoflurane anesthesia, and 350-μm-thick hippocampal slices were collected in ice-cold dissection buffer containing: 212 mM sucrose; 3 mM KCl; 5 mM $MgCl_2$; 0.5 mM $CaCl_2$; 1 mM $NaH_2PO_4$; 26 mM $NaHCO_3$; and 10 mM D-glucose. Dissection buffer was bubbled with 95% v/v $O_2$/5% v/v $CO_2$. Slices were transferred onto a Millicell cell-culture insert (Millipore; Billerica, MA, USA) and were placed in medium 1 containing Eagle's Minimum Essential Medium [50% (vol/vol)], horse serum [25% (vol/vol)], Earle's Balanced Salt Solution [18% (vol/vol)], D-glucose (32-35 mM), Hepes (25 mM), glutamine (2 mM), Amphotericin B (2.5 μg/mL), and streptomycin sulfate (100 μg/mL). After 24 hours, the culture medium was changed to medium 2 of similar composition but containing a lower concentration of horse serum [5% (vol/vol)], and then replaced every 2-3 days. Slices were exposed to oligomerized Aβ1-42 peptide containing 500 nM oligomers, 10 μM memantine, or 50 nM Au-Mem for 10 days, replenished accordingly with each medium replacement. Dendritic spine density was evaluated as follow: Slices were fixed in 4% paraformaldehyde, and images of YFP-expressing cells were acquired by deconvolution microscopy using SlideBook software. For YFP-expressing neurons (n>5 for each condition), two distinct fields of secondary or tertiary dendrites at least 30 μm in length were selected randomly and analyzed using SlideBook software.

Example 7

Hybrid Nanostructures for Selective Inhibition of eNMDARs

Figure 2:
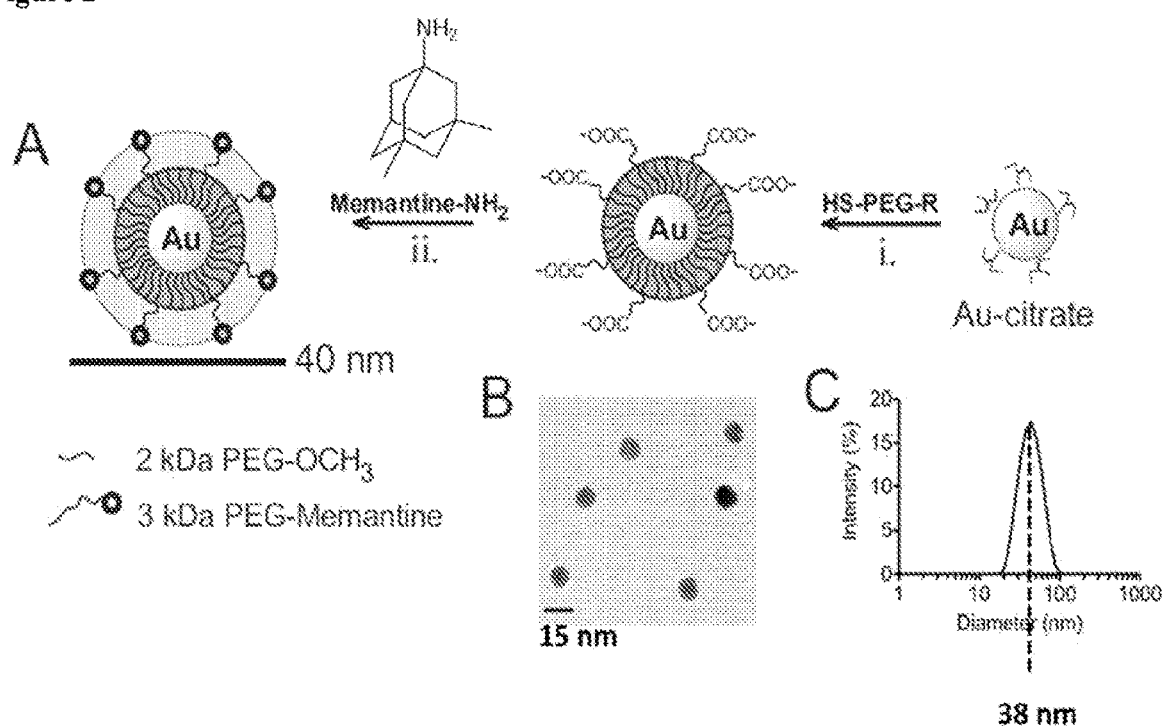
FIG. 2 shows an example preparation of a nanostructure conjugate. A gold citrate nanoparticle (NP) is reacted with a 3 kDa HS-PEG-R linker. This NP-linker intermediate is next reacted with memantine, gold (Au) NPs linked to memantine (Mem) molecules using EDC/NHA to form an amide bond through the memantine primary amino group. (B) Transmission electron microscopy shows the Au core diameter of 13 nm, scale bar 20 nm. (C) Dynamic light scattering of Au-Mem nanostructures, Z average 35 nm.

Memantine was selected for the role of an NMDAR antagonist and 12-nm Au NPS were used for the purpose of "bulking-up" an NMDA antagonist. Memantine was attached to Au NPs via polyethylene glycol (PEG) linkers (FIG. 2).

The first method for attaching memantine to Au NPs: a mixture of methoxy- and carboxyl acid-terminated PEG thiols was immobilized on the Au core followed by amide coupling of the primary amine of memantine (Mem) to the PEG carboxylate groups. The second method for attaching Memantine to Au NPs: Memantine-PEG-thiols were directly coupled to Au NPs, with methoxy-terminated PEG thiols used as fillers. The number of memantine molecules on a NP can be varied by changing the ratio of Memantine-carrying PEG molecules to methoxy-terminated PEG thiols. For example, for 1:4 ratio, it was estimated that the Au-Mem carried approximately 50 memantine molecules. The resulting Au-PEG-Memantine nanostructures had a hydrodynamic radius of 35 nm, as determined by dynamic light scattering measurements.

Example 8

Confirmation of Pharmacological Effects

Figure 3:
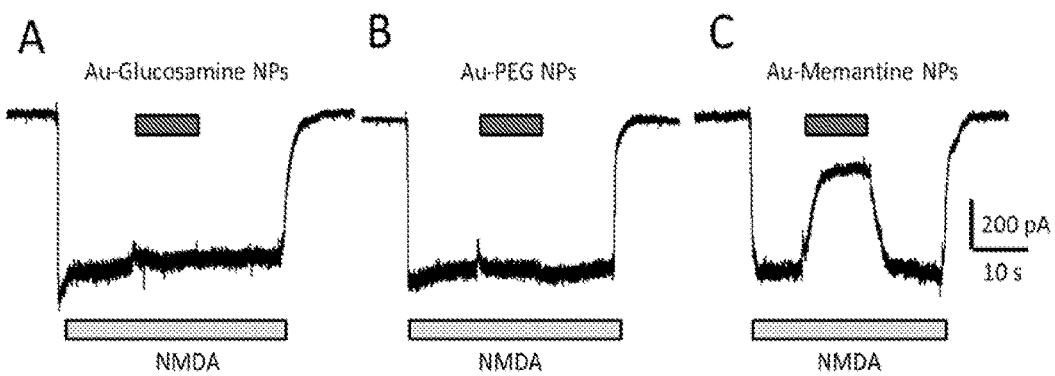
FIG. 3 shows that memantine conjugated to Au NPs retains its active pharmacological properties in respect to NMDA receptors. NMDA currents triggered by co-application of 200 µM NMDA and 20 µM glycine were blocked in the presence of Au-Mem nanostructure conjugates (FIG. 3A). At the same time, Au NPs with pharmacologically inert molecules (such as PEG polymers (FIG. 3B) or glucosamine molecules (FIG. 3C)) conjugated instead of memantine have no effect on NMDAR-mediated currents. Recordings were performed in the presence of 1 µM tetrodoxin (TTX). Grey boxes represent NMDA application, and black boxes represent application of the compounds indicated above.

To evaluate their pharmacological profile, the effects of Au-Mem on NMDAR-mediated currents were evaluated in cerebrocortical neurons using patch-clamp whole-cell recordings. When applied in the absence of NMDA, 10 nM Au-Mem had no effect on subsequently elicited NMDA currents, indicating that Au-Mem did not interact with closed NMDARs. When applied in the presence of saturating concentrations of NMDA (200 μM), Au-Mem (100 nM) blocked 62.55±9.72% (n=15) of NMDA-mediated ion currents (FIG. 3A). Under the same experimental conditions, Au-Glucosamine and Au-PEG at 50 nM had no effect (n=5) on NMDARs (FIG. 3B, C). These results were confirmed in greater than 500 neurons by imaging experiments (n=5) that monitored changes in calcium influx as a result of application of NMDA and the above mentioned nanostructure conjugates. These findings indicate that that a) conjugation did not affect pharmacological properties of memantine as an open-channel NMDAR antagonist; b) properties of a PEG linker (i.e., flexibility and length) used for conjugating memantine molecules to Au NPs allow them an unhampered access to a binding site inside the NMDA channel pore; c) pharmacological properties of a fully assembled nanostructure are determined solely by a conjugated antagonist molecule rather than by Au NPs or their polymer coatings.

Figure 4:
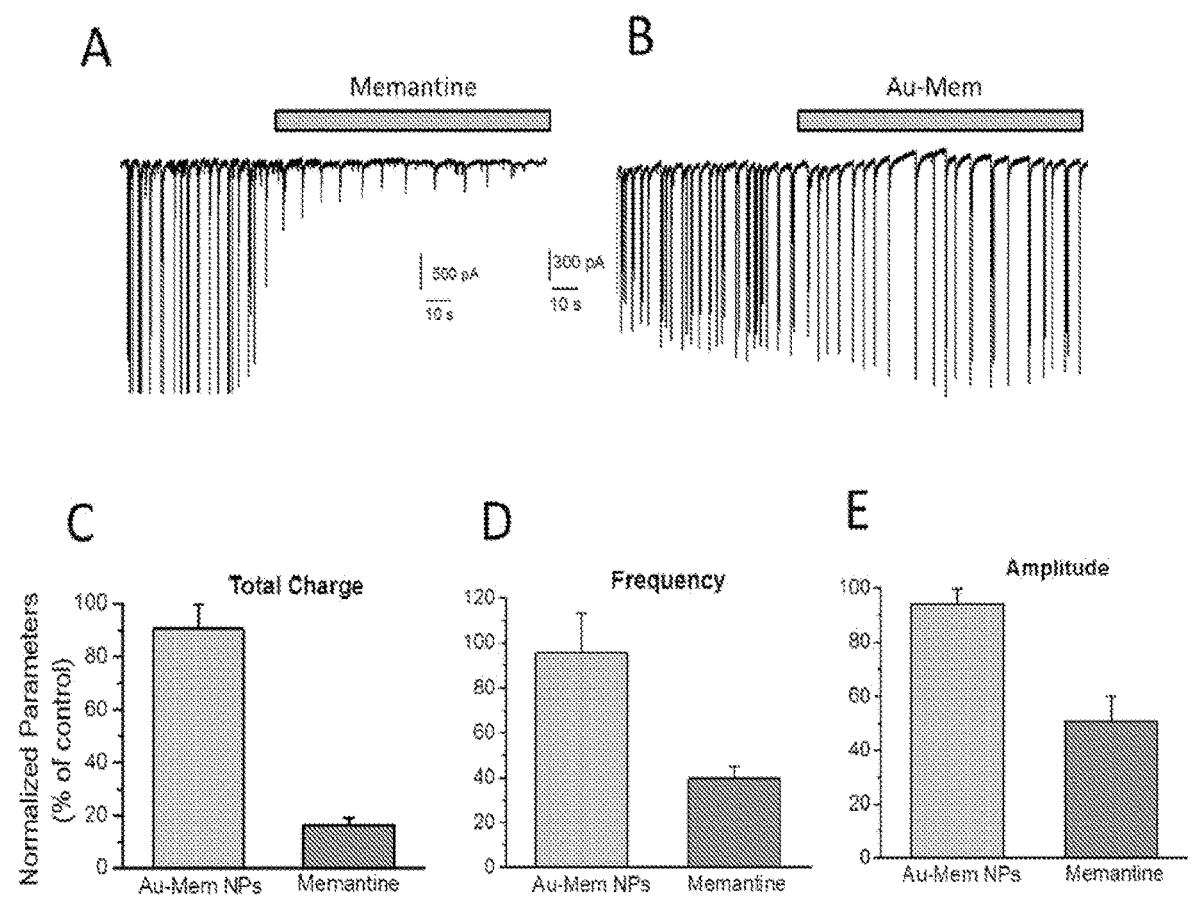
FIG. 4 shows the lack of inhibitory effects from Au-Memantine nanostructure conjugates on spontaneous synaptic activity in cerebrocortical neurons. NMDA receptors mediate this synaptic activity, and application of free (non-conjugated) memantine can almost completely inhibit it (FIG. 4A). At the same time, memantine linked to Au NPs (Au-Mem) have no effect on the synaptic activity (FIG. 4B).

Au-Mem had no noticeable effect on the synaptic activity of cerebrocortical neurons as determined by whole-cell patch-clamp recordings of spontaneous excitatory postsynaptic currents (sEPSCs) in the presence of Au-Mem, while free memantine at 10 μM did block it (FIG. 4 A, B). Using the strategy of temporal separation, an analysis of NMDAR-mediated component of sEPSCs was performed by excluding the initial transient component of sEPSCs mediated by AMPA glutamate receptors. Detailed analysis of normalized total charge, frequency, and amplitude of NMDAR-mediated sEPSCs demonstrated in the presence of Au-Mem and memantine (FIG. 4 C-E) confirms that Au-Mem was not capable of inhibiting sNMDARs. Considering that, as demonstrated above, Au-Mem is a highly efficient inhibitor of the NMDAR activity, the lack of inhibition of sNMDARs means that Au-Mem simply cannot reach sNMDARs. As a result, these novel Au-Mem can block all NMDARs, except sNMDARs, thus satisfying the original goal of developing a sub-type selective NMDAR antagonist that would preserve the activity of sNMDARs.

To assess the effectiveness of Au-Mem in inhibiting NMDARs, different concentrations of Au-Mem were applied on fully activated NMDARs (in the presence of 200 μNMDA and 10μ glycine), and a dose-response curve was constructed. The Hill coefficient for Au-Mem is about 1 which is expected of a pore blocker. The half maximal inhibitory concentration ($IC_{50}$) for Au-Mem is about 20 nM, which makes it 50 times more efficient in blocking NMDARs than memantine alone ($IC_{50}$ about 1 μM). Such high apparent affinity of Au-Mem is likely due to a) the presence of multiple memantine molecules residing on one Au-Memantine NP, and b) the immediate availability of multiple memantine molecules in the close vicinity to a NMDAR after the memantine molecule that inhibited a NMDAR will dissociate from a NMDAR, which results in the increase of memantine concentrations in the microspace.

Example 9

Use for Alzheimer's Disease

Synaptic loss is the fundamental feature linking neuropathology in Alzheimer's disease to cognitive decline. Soluble amyloid beta (Aβ) oligomers are known to produce synaptic depression in hippocampal slices. It was previously established that eNMDARs mediate Aβ-induced signaling pathways leading to synaptic spine loss. Therefore, inhibition of eNMDARs is expected to disrupt these neurodegenerative pathways and prevent the loss of the synapses even in the presence of Aβ oligomers. Organotypic hippocampal slices from YFP mice were treated with 5 μM Aβ oligomers in the presence and absence of 10 μM memantine and 50 nM Au-Mem for 10 days. Using quantative fluorescent imaging, it was determined that Au-Mem worked significantly better than free memantine in protecting from detrimental effects of Aβ oligomers on synaptic dendritic spines (FIG. 5).

Example 10

Nanostructures Containing Amantadine

Nanostructures can also be prepared containing amantadine (1-adamantylamine), an NMDA antagonist structurally similar to memantine.

Example 11

Delivery of Hybrid Nanostructures to the Brain

Hybrid nanostructures can be delivered to the brain via a variety of different routes, such as intranasal delivery, intraperitoneal delivery, interstitial delivery, and so on. To facilitate a specific route of drug delivery to the brain, hybrid nanostructures can undergo a route-specific optimization of their surface properties via conjugation of additional molecules leading to enhanced targeting and/or penetration into the brain.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A nanostructure conjugate comprising:
at least one core nanostructure with a physical diameter less than 25 nm linked to at least one modulator compound capable of targeting and modulating a transmembrane protein of neural cell membranes,
wherein the nanostructure conjugate has an average hydrodynamic diameter larger than a synaptic cleft opening and not greater than 75 nm, and wherein the modulator compound is linked to the core nanostructure by a flexible linker such that the nanostructure conjugate is capable of modulating the transmembrane protein, and
wherein a plurality of nanostructure conjugates is capable of exclusively modulating transmembrane proteins at extrasynaptic locations of neural cell membranes of neural tissue while not modulating transmembrane proteins at synaptic locations of neural cell membranes of neural tissue.

2. The nanostructure conjugate of claim 1, wherein the core nanostructure is gold, silver, iron, iron oxide, lanthanide oxide, transition metal, transition metal oxide, silica, porous silica, semiconductor, crystalline, amorphous, lamellar, protein, human serum albumin, hyaluronic acid, dextran, proteoglycan, sulfated biopolymer, carboxybetaine polymer, sulfobetaine polymer, block co-polymer, inorganic core with a polymer shell, an organic core with a polymer shell, or an inorganic core with inorganic shell and polymer shell.

3. The nanostructure conjugate of claim 1, wherein the modulator compound is a NMDA receptor antagonist, irrespective of NMDA receptor subunit type.

4. The nanostructure conjugate of claim 3, wherein the NMDA receptor antagonist is APV, AP7, Atomoxetine, Amantadine, AZD6765, CPPene, Delucemine, Dexoxadrol, Dextrallorphan, Dextromethorphan, Dextrorphan, Diphenidine, Dizocilpine, Eliprodil, Eticyclidine, Etoxadrol, Gacyclidine, Ibogaine, Ketamine, Methoxetamine, HU-211, Methoxydine, Neramexane, Phencyclidine, Rolicyclidine, Tenocyclidine, Tiletamine, Remacemide, Rhynchophylline, or Selfotel.

5. The nanostructure conjugate of claim 1, wherein the modulator compound is memantine or rimantadine.

6. The nanostructure conjugate of claim 1, wherein the linker is polyethylene glycol or polylactic acid.

7. The nanostructure conjugate of claim 1, wherein the core nanostructure has a physical diameter of 12 nm to 13 nm.

8. The nanostructure conjugate of claim 1, wherein the nanostructure conjugate has an average hydrodynamic diameter in a range of 35 nm to 75 nm.

9. The nanostructure conjugate of claim 1, wherein 5 to 200 modulator compounds are linked to the core nanostructure.

10. A method of modulating transmembrane proteins of neural cell membranes, the method comprising exclusively contacting transmembrane proteins at extrasynaptic locations with the nanostructure conjugate of claim 1 while not contacting transmembrane proteins at synaptic locations with the nanostructure conjugate of claim 1.

11. The method of claim 10, wherein the core nanostructure is gold, silver, iron, iron oxide, lanthanide oxide, transition metal, transition metal oxide, silica, porous silica, semiconductor, crystalline, amorphous, lamellar, protein, human serum albumin, hyaluronic acid, dextran, proteoglycan, sulfated biopolymer, carboxybetaine polymer, sulfobetaine polymer, block co-polymer, inorganic core with a polymer shell, an organic core with a polymer shell, or an inorganic core with inorganic shell and polymer shell.

12. The method of claim 10, wherein the modulator compound is a NMDA receptor antagonist, irrespective of NMDA receptor subunit type.

13. The method of claim 12, wherein the NMDA receptor antagonist is APV, AP7, Atomoxetine, Amantadine, AZD6765, CPPene, Delucemine, Dexoxadrol, Dextrallorphan, Dextromethorphan, Dextrorphan, Diphenidine, Dizocilpine, Eliprodil, Eticyclidine, Etoxadrol, Gacyclidine, Ibogaine, Ketamine, Methoxetamine, HU-211, Methoxydine, Neramexane, Phencyclidine, Rolicyclidine, Tenocyclidine, Tiletamine, Remacemide, Rhynchophylline, or Selfotel.

14. The method of claim 10, wherein the modulator compound is memantine or rimantadine.

15. The method of claim 10, wherein the linker is polyethylene glycol or polylactic acid.

16. The method of claim 10, wherein the core nanostructure has a physical diameter of 12 nm to 13 nm.

17. The method of claim 10, wherein the nanostructure conjugate has an average hydrodynamic diameter in a range of 35 nm to 75 nm.

18. The method of claim 10, wherein 5 to 200 modulator compounds are linked to the core nanostructure.

19. The method of claim 10, wherein the contacting comprises administering the nanostructure conjugate to an animal.

20. The method of claim 19, wherein the animal is a mammal, a primate, a dog, a cat, a mouse, a rat, a cow, a horse, or a pig.

21. The method of claim 19, wherein the animal is a human.

22. A nanostructure conjugate comprising:
a core nanostructure with a physical diameter less than 25 nm;
a plurality of linker molecules bonded to the core nanostructure; and a plurality of modulator compounds having modulatory activity for glutamate receptors of neural cell membranes of the neural tissue, the plurality of modulator compounds comprising NMDA receptor modulators, the plurality of modulator compounds linked to the plurality of linker molecules such that a plurality of nanostructure conjugates is capable of modulating NMDA receptors of neural cell membranes, the nanostructure conjugate having an average hydrodynamic diameter larger than a synaptic cleft opening of the neural tissue and in a range of 25 nm to 75 nm, whereby a plurality of nanostructure conjugates is capable of exclusively modulating NMDA receptors at extrasynaptic locations of neural cell membranes of neural tissue while not modulating NMDA receptors at synaptic locations of neural cell membranes of neural tissue.

23. The nanostructure conjugate of claim 22, wherein the nanostructure conjugate is unable to access glutamate receptors in synaptic regions of the neural cell membranes but is able to interact with glutamate receptors in extrasynaptic regions of the neural cell membranes.

24. The nanostructure conjugate of claim 22, wherein the average hydrodynamic diameter is in a range of 25 nm to 50 nm.

25. The nanostructure conjugate of claim 24, wherein the core nanostructure has a physical diameter of 12 nm to 13 nm and the plurality of linker molecules comprises polyethylene glycol.

26. The method of using a nanostructure conjugate of claim 22 in the manufacturing of pharmaceuticals for treating or preventing a medical condition in an animal, wherein the nanostructure conjugate comprises at least one nanostructure linked to at least one modulator compound and targets membrane proteins in extrasynaptic locations, wherein the medical condition is Alzheimer's disease.

27. The method of using a nanostructure conjugate of claim 22 in the manufacturing of pharmaceuticals for treating or preventing a medical condition in an animal, wherein the nanostructure conjugate comprises at least one nanostructure linked to at least one modulator compound and targets membrane proteins in extrasynaptic locations, wherein the medical condition is selected from the group consisting of: Parkinson's disease; amyotrophic lateral sclerosis; Huntington's disease; Down's syndrome; autism; Asperger's Syndrome; Rett syndrome; Fragile X syndrome; epilepsy and other seizure disorders; traumatic brain injury; schizophrenia and other psychotic disorders; pain, neuropathic pain, hyperalgesia and disorders of nociception; stroke; glaucoma and other eye disorders; vascular dementia, or HIV-associated dementia.

28. The method of claim 27, wherein the animal is a mammal, a primate, a dog, a cat, a mouse, a rat, a cow, a horse, or a pig.

29. The method of claim 27, wherein the animal is a human.

* * * * *